(12) United States Patent
Batsch et al.

(10) Patent No.: US 11,001,118 B2
(45) Date of Patent: May 11, 2021

(54) USER SELECTED SETTINGS FOR VEHICLE WITH PNEUMATIC SUSPENSION AND TIRE INFLATION SYSTEM

(71) Applicant: Hendrickson USA, L.L.C., Itasca, IL (US)

(72) Inventors: Christopher J. Batsch, Naperville, IL (US); Christopher E. Cantagallo, Chicago, IL (US); Bradley S. Ketchel, Naperville, IL (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 0 days.

(21) Appl. No.: 16/021,968

(22) Filed: Jun. 28, 2018

(65) Prior Publication Data

US 2018/0304715 A1    Oct. 25, 2018

Related U.S. Application Data

(62) Division of application No. 15/019,814, filed on Feb. 9, 2016, now abandoned.

(51) Int. Cl.
*B60G 17/015*    (2006.01)
*B60G 17/052*    (2006.01)
(Continued)

(52) U.S. Cl.
CPC ........ B60G 17/0195 (2013.01); B60C 23/003 (2013.01); B60G 11/27 (2013.01);
(Continued)

(58) Field of Classification Search
CPC ............ B60G 17/0195; B60G 17/0155; B60G 17/015; B60G 17/0521; B60G 17/0528;
(Continued)

(56) References Cited

U.S. PATENT DOCUMENTS 3,102,573  A    9/1963   Winsen et al.
3,867,652  A    2/1975   Bjorklund et al.
(Continued)

FOREIGN PATENT DOCUMENTS

CN    105059075    11/2015
DE    10223257     12/2003
(Continued)

OTHER PUBLICATIONS

GS Engineering ACTIS brochure pre-2016, 2 pages.
(Continued)

*Primary Examiner* — Keith J Frisby
(74) *Attorney, Agent, or Firm* — McDonnell Boehnen Hulbert & Berghoff LLP

(57) ABSTRACT

A method of setting the rides height of the air springs and air pressures of the tires, including receiving a user selected setting or preprogrammed ride height settings; sensing a ride height of, and air pressure within, each of the air springs; determining the weight of the vehicle based on the sensed ride height and air pressure within each of the air springs; providing specified ride heights for the left and right front and rear air springs; determining specified air pressures for the left and right front and rear tire inflators, based upon the determined weight of the vehicle and selected setting; inflating the left and right front and rear air springs to the specified ride heights; and inflating the left and right front and rear tires to the specified air pressures.

6 Claims, 6 Drawing Sheets

(51) Int. Cl.
*B60G 17/033* (2006.01)
*B60G 11/27* (2006.01)
*B60W 40/13* (2012.01)
*B60G 17/0195* (2006.01)
*B60G 17/019* (2006.01)
*B60C 23/00* (2006.01)
*B60W 10/22* (2006.01)

(52) U.S. Cl.
CPC ....... *B60G 17/019* (2013.01); *B60G 17/0155* (2013.01); *B60G 17/033* (2013.01); *B60G 17/052* (2013.01); *B60W 40/13* (2013.01); *B60G 17/0523* (2013.01); *B60G 2202/152* (2013.01); *B60G 2206/0116* (2013.01); *B60G 2400/252* (2013.01); *B60G 2400/512* (2013.01); *B60G 2400/51222* (2013.01); *B60G 2400/60* (2013.01); *B60G 2500/30* (2013.01); *B60G 2600/20* (2013.01); *B60G 2600/21* (2013.01); *B60G 2800/87* (2013.01); *B60G 2800/914* (2013.01); *B60G 2800/984* (2013.01); *B60W 10/22* (2013.01); *B60W 2040/1307* (2013.01)

(58) Field of Classification Search
CPC .......... B60G 17/0523; B60G 17/052; B60G 17/033; B60G 11/27; B60G 2400/51222; B60G 2400/252; B60G 2600/21; B60G 2600/20; B60G 2500/30; B60G 2500/202; B60G 2500/201; B60G 2500/2012; B60G 2500/2014; B60G 2202/152; B60G 2206/0116; B60G 2800/914; B60W 10/22; B60W 40/13; B60W 2040/1307
USPC ..... 280/6.159, 6.157, 6.15, 124.157, 124.16, 280/124.161, 5.514; 267/64.16, 64.17, 267/64.19, 64.21, 64.28; 701/37
See application file for complete search history.

(56) References Cited

U.S. PATENT DOCUMENTS

| | | | |
|---|---|---|---|
| 4,641,698 A | 2/1987 | Bitonti | |
| 5,065,618 A | 11/1991 | Hodges, Sr. et al. | |
| 5,313,995 A | 5/1994 | Schultz | |
| 5,373,445 A | 12/1994 | Yopp | |
| 5,647,927 A | 7/1997 | Mason | |
| 6,138,708 A | 10/2000 | Waldbusser | |
| 6,144,295 A | 11/2000 | Adams et al. | |
| 6,578,648 B2 | 6/2003 | Bell | |
| 6,943,673 B2 | 9/2005 | Skoff et al. | |
| 7,273,082 B2 | 9/2007 | White et al. | |
| RE41,756 E | 9/2010 | Claussen et al. | |
| 8,528,611 B2 | 9/2013 | Wilson et al. | |
| 8,827,292 B2 | 9/2014 | Batsch et al. | |
| 8,973,633 B2 | 3/2015 | Wilson et al. | |
| 2003/0230443 A1 | 12/2003 | Cramer et al. | |
| 2006/0217914 A1 | 9/2006 | Bertness | |
| 2007/0044881 A1 | 3/2007 | Skoff | |
| 2007/0265749 A1 | 11/2007 | Fitzgibbons | |
| 2007/0295065 A1 | 12/2007 | Nordmeyer | |
| 2009/0174158 A1 | 7/2009 | Anderson et al. | |
| 2009/0289426 A1 | 11/2009 | Oscarsson et al. | |
| 2010/0078109 A1 | 4/2010 | Wilson et al. | |
| 2011/0127733 A1 | 6/2011 | Conradie | |
| 2013/0275002 A1 | 10/2013 | MacFarlane | |
| 2014/0350787 A1 | 11/2014 | Swanson | |
| 2015/0094906 A1 | 4/2015 | Greene et al. | |
| 2015/0174972 A1 | 6/2015 | Zhou et al. | |
| 2015/0197133 A1 | 7/2015 | VanRaaphorst | |

FOREIGN PATENT DOCUMENTS

| | | |
|---|---|---|
| EP | 2896514 | 7/2015 |
| GB | 891756 | 3/1962 |
| JP | 04-161827 | 6/1992 |
| JP | 2010276497 | 5/2009 |

OTHER PUBLICATIONS

International Searching Authority, International Search Report and Written Opinion dated Oct. 10, 2016, issued in connection with International Application No. PCT/US2016/032037, filed on May 12, 2016, 18 pages.

International Bureau of WIPO, International Preliminary Report on Patentability dated Aug. 14, 2018, issued in connection with International Application No. PCT/US2016/032037, filed on May 12, 2016, 12 pages.

400

A method of setting ride heights and air pressures of air springs and tires in a vehicle having an air spring and tire inflation system

↓ 402

Providing an air spring and tire inflation system including a control system, left and right side front air springs each monitored by an air pressure sensor in communication with the control system to sense air pressures within the left and right side front air springs, and each having an associated ride height sensor in communication with the control system to sense the ride heights of the left and right side front air springs, left and right side rear air springs each monitored by an air pressure sensor in communication with the control system to sense air pressures within the left and right side rear air springs, and each having an associated ride height sensor in communication with the control system to sense the ride heights of the left and right side rear air springs, left and right side front tire inflators, left and right side rear tire inflators, an air spring air pressure manifold, a tire air pressure manifold, a supply of pressurized air in communication with the air spring and tire air pressure manifolds, one or more air conduits extending from the air spring air pressure manifold to the left and right side front air springs, one or more air conduits extending from the air spring air pressure manifold to the left and right side rear air springs, one or more air conduits extending from the tire air pressure manifold to the left and right side front tire inflators, one or more air conduits extending from the tire air pressure manifold to the left and right side rear tire inflators, a user interface in communication with the control system, wherein the user interface includes a plurality of user selectable settings.

↓ 404 selecting a setting on the user interface

↓ 406 receiving air pressure and ride height readings from the left and right side front air springs and air pressure and ride height readings from the left and right side rear air springs from the air pressure and ride height sensors;

↓ 408 determining a weight of a vehicle on which the air spring and tire inflation system is positioned based on the received air pressure and ride height readings;

↓ 410 determining, based on the selected setting, ride height settings for the left and right side front air springs and ride height settings for the left and right side rear air springs;

USER SELECTED SETTINGS FOR VEHICLE WITH PNEUMATIC SUSPENSION AND TIRE INFLATION SYSTEM

RELATED APPLICATIONS

This is a divisional application of U.S. application Ser. No. 15/019,814 entitled "User Selected Settings for Vehicle With Pneumatic Suspension and Tire Inflation System" filed on Feb. 9, 2016, which is incorporated by reference in its entirety.

BACKGROUND

The present invention generally relates to vehicle suspensions. More particularly, the present invention relates to a vehicle air suspension system that includes an air spring and tire inflation system. Prior air spring assemblies have included a flexible air spring wherein the air spring includes a flexible membrane that expands as the strut is loaded. Typical air springs of this type with a flexible member provide a relatively low spring rate when compared to a mechanical spring.

In typical air springs with a flexible membrane, the operating pressures that may be utilized are limited because of the current limitations on flexible membrane and rubber construction. Thus, the typical operating pressure at normalized ride height is limited to 80-100 psi, up to 120 psi, with maximum pressure at full compression at around 200 psi. It is known that by increasing the effective spring rate of the strut assembly, the vehicle may achieve a higher ride frequency, and increased roll performance and lateral stability performance. In particular, when the effective spring rate of the strut at the designed ride height is increased, the need for auxiliary anti-roll devices may be eliminated.

In some applications using an air spring with a flexible membrane, a coil spring may be added to increase the effective spring rate of the strut. However, to achieve a desired effective spring rate at the designed ride height, the strut may require a larger spring, a larger volume of air (and thus a flexible membrane with a larger diameter) or a combination of both. In many applications, however, the space constraints, or limited footprint available for a strut, do not allow for an air spring with a flexible membrane even when combined with a coil spring to achieve the desired increased effective spring rate at the designed ride height of a vehicle because of the increased size of the strut required to achieve the desired effective spring rate.

In some applications, an air spring capable of operating at increased operating pressures has been provided. For example, in U.S. Pat. No. 8,827,292 entitled "Cylinder Shock Assembly," filed on Aug. 7, 2012 and issued on Sep. 9, 2014, herein incorporated by reference, an air spring having a solid body is provided that operates under elevated pressures and provides for an increased effective spring rate at the designed ride height. With such an air spring with a solid body, the air spring changes the spring rate with respect to the weight on the air spring to minimize the ride frequency differences between a loaded and unloaded vehicle. A primary reason air springs (flexible or solid) are desired is to accommodate loaded and unloaded vehicle weights. The air springs increase spring rate by increasing the air pressure as vehicle weight is added. Air springs also ensure the proper ride height is achieved at the weights experienced as well.

Tire inflation and monitoring systems are also known. For example, in U.S. Pat. No. 7,273,082 entitled "Tire Inflation System Apparatus and Method," issued on Sep. 27, 2007, a tire inflation system is provided. Similarly, in U.S. Pat. No. 8,528,611 entitled "Tire Inflation System With Parallel Pump," issued on Sep. 10, 2013, a tire inflation system is provided. U.S. Pat. Nos. 7,273,082 and 8,528,611 are herein incorporated by reference.

Vehicles may encounter various terrains. The vehicle ride height and front and rear tire pressures may need to be adjusted based on the terrain. In prior systems, the ride height of the vehicle and the tire pressures are set separately to provide for desired ride characteristics. It would be desirable to provide a system in which a user selects a terrain setting, and the system automatically provides a predetermined ride height based on the vehicle type and a selected terrain setting, or automatically specifies a ride height based on the selected terrain setting, determined vehicle weight, and/or vehicle type, and specifies front and rear tire pressures based on a determined vehicle weight and selected terrain setting.

SUMMARY

In one aspect, a method and system of setting the ride height and front and rear tire pressures on a vehicle having an air spring and tire inflation system is provided. A user selects a user selectable terrain setting, or setting, on a user interface in communication with an electronic control unit. The system selects a predetermined ride height based on the selected terrain setting and predetermined vehicle type. Alternately, the system may specify a ride height based on the selected terrain setting, and/or vehicle type, and determined weight of the vehicle determined by sensing a ride height of each of the air springs and by sensing the air pressure within each of the air springs. Based on the ride height of, and the air pressure within, the air springs, a weight of the vehicle is determined. Based on the determined weight of the vehicle and the selected terrain setting, and/or vehicle type, a specified ride height for the front air springs is determined, and a specified ride height for the rear air springs is determined. Based on the determined weight of the vehicle and the selected terrain setting, a specified air pressure for the front tires is determined, and a specified air pressure for the rear tires is determined. Separate and potentially different air pressures may also be specified for the left and right side tires of the front and rear tires. The front and rear air springs are adjusted (by inflation or deflation) to the predetermined or specified ride height. The front and rear tires are then inflated to the specified air pressures. Thus, the present method and system, upon only the selection of a terrain setting, advantageously automatically adjusts the ride height of the front and rear air springs to the predetermined or specified ride height (based on the selected terrain setting and determined weight of the vehicle, and/or vehicle type), and also adjusts the front and rear tire pressures to the specified air pressures based on the selected terrain setting and determined weight of the vehicle.

In another aspect, the user selected setting specifies whether the vehicle is loaded or unloaded. Based on the selected setting, the system automatically specifies a ride height for the air springs and air pressures for the front and rear tires, without the need to determine the weight of the vehicle. Furthermore, in some vehicles, the weight does not change to any appreciable degree, and with such a vehicle, based on the selected setting, the system automatically specifies a ride height for each of the air springs, and air pressures for the front and rear tires, without determining the weight of the vehicle.

In another aspect, an air spring and tire inflation system is provided including a control system, left and right side front air springs each monitored by an air pressure sensor in communication with the control system to sense air pressures within the left and right side front air springs, and each having an associated ride height sensor in communication with the control system to sense the ride heights of the left and right side front air springs, left and right side rear air springs each monitored by an air pressure sensor in communication with the control system to sense air pressures within the left and right side rear air springs, and each having an associated ride height sensor in communication with the control system to sense the ride heights of the left and right side rear air springs, left and right side front tire inflators, left and right side rear tire inflators, an air spring air pressure manifold, a tire air pressure manifold, a supply of pressurized air in communication with the air spring and tire air pressure manifolds, one or more air conduits extending from the air spring air pressure manifold to the left and right side front air springs, one or more air conduits extending from the air spring air pressure manifold to the left and right side rear air springs, one or more air conduits extending from the tire air pressure manifold to the left and right side front tire inflators, one or more air conduits extending from the tire air pressure manifold to the left and right side rear tire inflators, a user interface in communication with the control system, wherein the user interface includes a plurality of user selectable settings, wherein after a setting has been selected, the control system is adapted to receive air pressure and ride height readings from the left and right side front air springs and air pressure and ride height readings from the left and right side rear air springs from the air pressure and ride height sensors, and the control system is adapted to determine a weight of a vehicle on which the air spring and tire inflation system is positioned based on the received air pressure and ride height readings, wherein the control system is adapted to determine, based on the selected setting, ride height settings for the left and right side front air springs and ride height settings for the left and right side rear air springs, wherein the control system is adapted to determine, based on the selected setting and determined weight of the vehicle, air pressure settings for the left and right side front tire inflators and air pressure settings for the left and right side rear tire inflators, wherein the control system is adapted to communicate to the air spring air pressure manifold the determined ride height settings for the left and right side front air springs and the determined ride height settings for the left and right side rear air springs, and the air spring air pressure manifold is adapted to inflate the left and right side front air springs to the determined ride height settings for the left and right side front air springs, and the air spring air pressure manifold is adapted to inflate the left and right side rear air springs to the determined ride height settings for the left and right side rear air springs, and wherein the control system is adapted to communicate to the tire air pressure manifold the determined air pressure settings for the left and right side front tire inflators and the determined air pressure settings for the left and right side rear tire inflators, and the tire air pressure manifold is adapted to provide the air pressure of the determined air pressure settings for the left and right side front tire inflators to the left and right side front tire inflators, and the tire air pressure manifold is adapted to provide the air pressure of the determined air pressure settings for the left and right side rear tire inflators to the left and right side rear tire inflators.

In another aspect, an air spring and tire inflation system is provided including a control system, left and right side front air springs each monitored by an air pressure sensor in communication with the control system to sense air pressures within the left and right side front air springs, and each having an associated ride height sensor in communication with the control system to sense the ride heights of the left and right side front air springs, left and right side rear air springs each monitored by an air pressure sensor in communication with the control system to sense air pressures within the left and right side rear air springs, and each having an associated ride height sensor in communication with the control system to sense the ride heights of the left and right side rear air springs, left and right side front tire inflators, left and right side rear tire inflators, an air spring air pressure manifold, a tire air pressure manifold, a supply of pressurized air in communication with the air spring and tire air pressure manifolds, one or more air conduits extending from the air spring air pressure manifold to the left and right side front air springs, one or more air conduits extending from the air spring air pressure manifold to the left and right side rear air springs, one or more air conduits extending from the tire air pressure manifold to the left and right side front tire inflators, one or more air conduits extending from the tire air pressure manifold to the left and right side rear tire inflators, a user interface in communication with the control system, wherein the user interface includes a plurality of user selectable settings, wherein after a setting has been selected, the control system is adapted to receive air pressure and ride height readings from the left and right side front air springs and air pressure and ride height readings from the left and right side rear air springs from the air pressure and ride height sensors, wherein the control system is adapted to determine, based on the selected setting, ride height settings for the left and right side front air springs and ride height settings for the left and right side rear air springs, wherein the control system is adapted to determine, based on the selected setting and vehicle type, air pressure settings for the left and right side front tire inflators and air pressure settings for the left and right side rear tire inflators, wherein the control system unit is adapted to communicate to the air spring air pressure manifold the determined ride height settings for the left and right side front air springs and the determined ride height settings for the left and right side rear air springs, and the air spring air pressure manifold is adapted to inflate the left and right side front air springs to the determined ride height settings for the left and right side front air springs, and the air spring air pressure manifold is adapted to inflate the left and right side rear air springs to the determined ride height settings for the left and right side rear air springs, and wherein the control system is adapted to communicate to the tire air pressure manifold the determined air pressure settings for the left and right side front tire inflators and the determined air pressure settings for the left and right side rear tire inflators, and the tire air pressure manifold is adapted to provide the air pressure of the determined air pressure settings for the left and right side front tire inflators to the left and right side front tire inflators, and the tire air pressure manifold is adapted to provide the air pressure of the determined air pressure settings for the left and right side rear tire inflators to the left and right side rear tire inflators.

In yet another aspect, a method of setting ride heights and air pressures of air springs and tires in a vehicle having an air spring and tire inflation system is provided including the steps of (i) providing an air spring and tire inflation system including a control system, left and right side front air springs each monitored by an air pressure sensor in communication with the control system to sense air pressures within the left and right side front air springs, and each having an associated ride height sensor in communication with the control system to sense the ride heights of the left and right side front air springs, left and right side rear air springs each monitored by an air pressure sensor in communication with the control system to sense air pressures within the left and right side rear air springs, and each having an associated ride height sensor in communication with the control system to sense the ride heights of the left and right side rear air springs, left and right side front tire inflators, left and right side rear tire inflators, an air spring air pressure manifold, a tire air pressure manifold, a supply of pressurized air in communication with the air spring and tire air pressure manifolds, one or more air conduits extending from the air spring air pressure manifold to the left and right side front air springs, one or more air conduits extending from the air spring air pressure manifold to the left and right side rear air springs, one or more air conduits extending from the tire air pressure manifold to the left and right side front tire inflators, one or more air conduits extending from the tire air pressure manifold to the left and right side rear tire inflators, a user interface in communication with the control system, wherein the user interface includes a plurality of user selectable settings; (ii) selecting a setting on the user interface; (iii) receiving air pressure and ride height readings from the left and right side front air springs and air pressure and ride height readings from the left and right side rear air springs from the air pressure and ride height sensors; (iv) determining a weight of a vehicle on which the air spring and tire inflation system is positioned based on the received air pressure and ride height readings; (v) determining, based on the selected setting, ride height settings for the left and right side front air springs and ride height settings for the left and right side rear air springs; (vi) determining, based on the selected setting and determined weight of the vehicle, air pressure settings for the left and right side front tire inflators and air pressure settings for the left and right side rear tire inflators; (vii) communicating to the air spring air pressure manifold the determined ride height settings for the left and right side front air springs and the determined ride height settings for the left and right side rear air springs; (viii) using the air spring air pressure manifold to inflate the left and right side front air springs to the determined ride height settings for the left and right side front air springs, and using the air spring air pressure manifold to inflate the left and right side rear air springs to the determined ride height settings for the left and right side rear air springs; (ix) communicating to the tire air pressure manifold the determined air pressure settings for the left and right side front tire inflators and the determined air pressure settings for the left and right side rear tire inflators; (x) using the tire air pressure manifold to provide the air pressure of the determined air pressure settings for the left and right side front tire inflators to the left and right side front tire inflators, and using the tire air pressure manifold to provide the air pressure of the determined air pressure settings for the left and right side rear tire inflators to the left and right side rear tire inflators; and inflating left and right side front and rear tires on the vehicle with the left and right side front and rear tire inflators to the specified air pressures for the left and right side front and rear tire inflators.

In yet another aspect, a method of setting ride heights and air pressures of air springs and tires in a vehicle having an air spring and tire inflation system is provided, including the steps of: (i) providing an air spring and tire inflation system including a control system, left and right side front air springs each monitored by an air pressure sensor in communication with the control system to sense air pressures within the left and right side front air springs, and each having an associated ride height sensor in communication with the control system to sense the ride heights of the left and right side front air springs, left and right side rear air springs each monitored by an air pressure sensor in communication with the control system to sense air pressures within the left and right side rear air springs, and each having an associated ride height sensor in communication with the control system to sense the ride heights of the left and right side rear air springs, left and right side front tire inflators, left and right side rear tire inflators, an air spring air pressure manifold, a tire air pressure manifold, a supply of pressurized air in communication with the air spring and tire air pressure manifolds, one or more air conduits extending from the air spring air pressure manifold to the left and right side front air springs, one or more air conduits extending from the air spring air pressure manifold to the left and right side rear air springs, one or more air conduits extending from the tire air pressure manifold to the left and right side front tire inflators, one or more air conduits extending from the tire air pressure manifold to the left and right side rear tire inflators, a user interface in communication with the control system, wherein the user interface includes a plurality of user selectable settings; (ii) selecting a setting on the user interface; (iii) receiving air pressure and ride height readings from the left and right side front air springs and air pressure and ride height readings from the left and right side rear air springs from the air pressure and ride height sensors; (iv) determining, based on the selected setting, ride height settings for the left and right side front air springs and ride height settings for the left and right side rear air springs; (v) determining, based on the selected setting and vehicle type, air pressure settings for the left and right side front tire inflators and air pressure settings for the left and right side rear tire inflators; (vi) communicating to the air spring air pressure manifold the determined ride height settings for the left and right side front air springs and the determined ride height settings for the left and right side rear air springs; (vii) using the air spring air pressure manifold to inflate the left and right side front air springs to the determined ride height settings for the left and right side front air springs, and to inflate the left and right side rear air springs to the determined ride height settings for the left and right side rear air springs; (viii) communicating to the tire air pressure manifold the determined air pressure settings for the left and right side front tire inflators and the determined air pressure settings for the left and right side rear tire inflators; (ix) using the tire air pressure manifold to provide the air pressure of the determined air pressure settings for the left and right side front tire inflators to the left and right side front tire inflators, and using the tire air pressure manifold to provide the air pressure of the determined air pressure settings for the left and right side rear tire inflators to the left and right side rear tire inflators; and (x) inflating the left and right front and rear tires on the vehicle with the left and right side front and rear tire inflators to the specified air pressures for the left and right side front and rear tire inflators.

BRIEF DESCRIPTION OF THE DRAWINGS

Exemplary embodiments of the invention are described herein with reference to the drawings, wherein like parts are designated by like reference numerals, and wherein:

FIGS. 4A and 4B show the steps of an example method 400.

DETAILED DESCRIPTION OF THE INVENTION

Figure 1A:
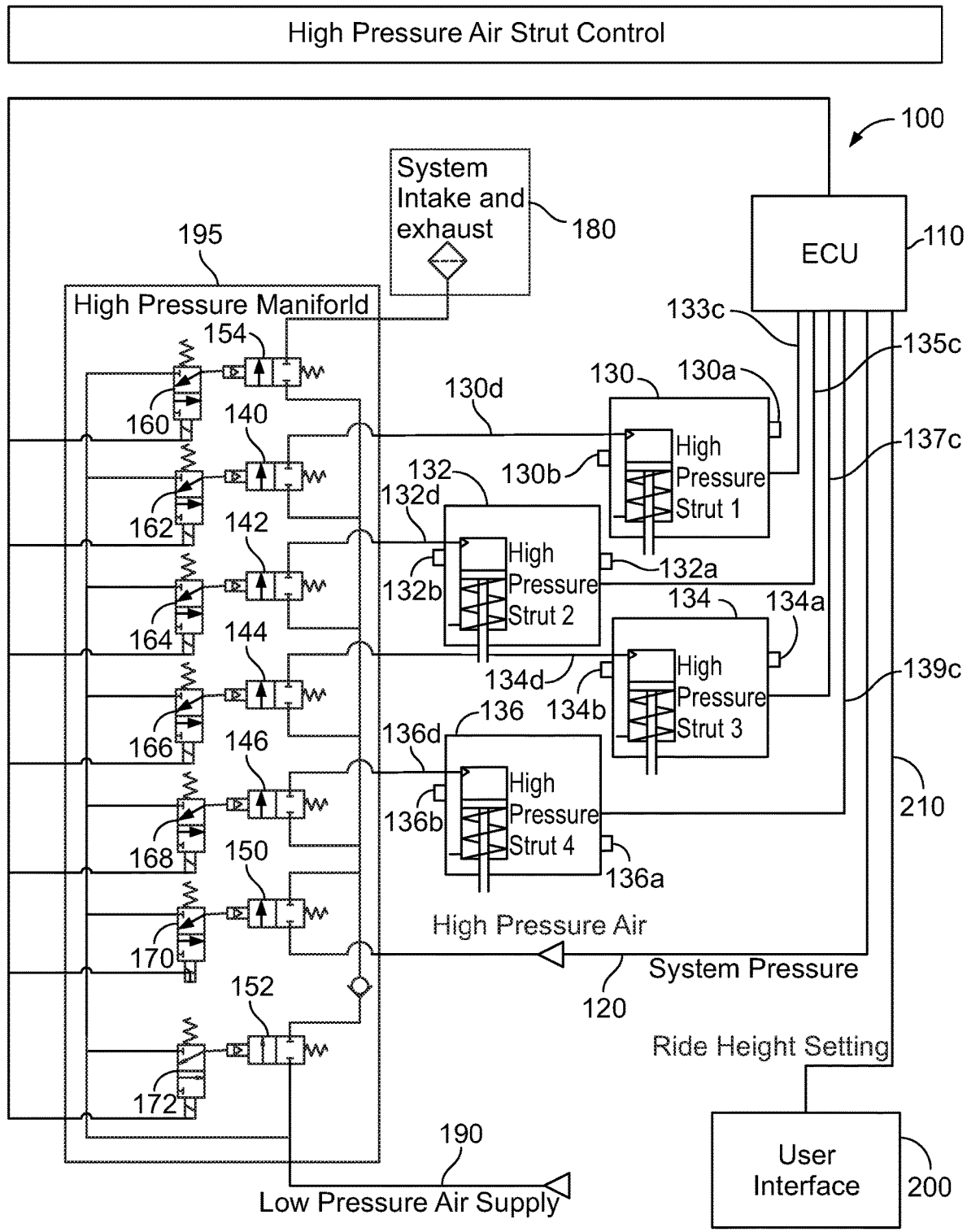
FIG. 1A is a diagram of an air spring and tire inflation system 100 used to inflate the air springs to specified ride heights.
Figure 1B:
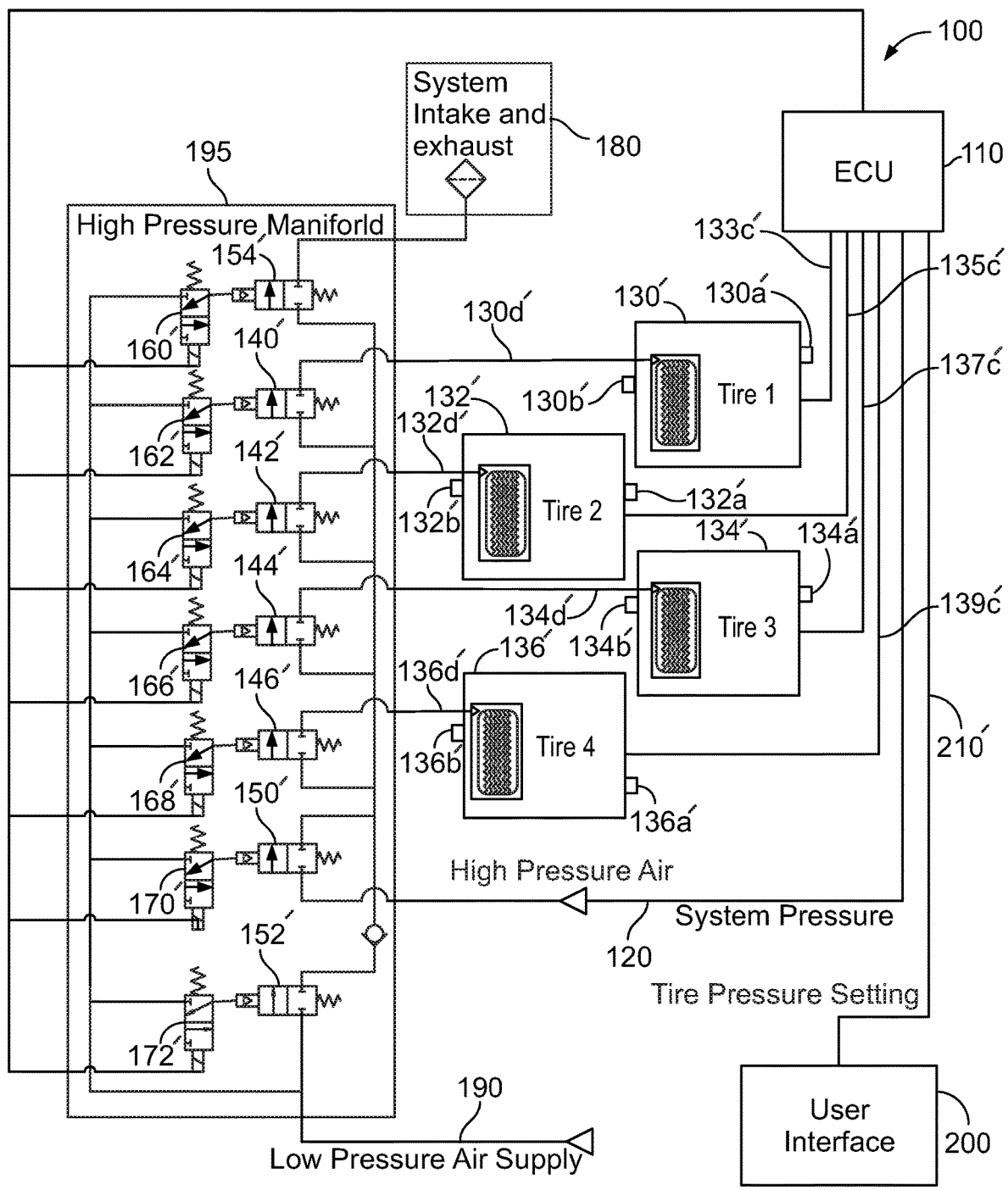
FIG. 1B is a diagram of an air spring and tire inflation system 100 used to inflate the tires to specified air pressures.

FIGS. 1A and 1B show diagrams of air spring and tire inflation system 100. System 100 may be installed on a vehicle to provide automated air spring inflation to inflate air springs to predetermined or specified ride height settings and automated tire inflation to inflate tires to specified air pressures. FIG. 1A shows details of the air inflation system 100 for inflating air springs 130, 132, 134, and 136 using air pressure manifold 195. FIG. 1B shows details of air inflation system 100 for inflating tires 130', 132', 134', and 136' with air pressure manifold 195. In operation, a user selects one of a plurality of user selectable terrain settings, or settings, positioned on user interface 200, which is in communication with electronic control unit (ECU) 110, via electrical line 210. The weight of the vehicle is determined by sensing the ride height of air springs 130, 132, 134, and 136 using ride height sensors 130a, 132a, 134a, and 136a associated with air springs 130, 132, 134, and 136 which are in communication with the ECU 110 via electrical lines 133c, 135c, 137c, and 139c respectively. The volume of air within each of the air springs 130, 132, 134, and 136 may be determined by knowing the ride height of each of the air springs 130, 132, 134, and 136. Air pressure sensors 130b, 132b, 134b, and 136b associated with air springs 130, 132, 134, and 136 sense the air pressure within each of the air springs 130, 132, 134, and 136 and communicate the sensed air pressure to the ECU 110 via electrical lines 133c, 135c, 137c, and 139c. Wireless communication between the ride height sensors, air pressure sensors, and the user interface and the ECU 110 is also possible. Alternately, the ride height may be predetermined based on the selected terrain setting and vehicle type. Alternately, a single air pressure sensor may be positioned in the air pressure manifold 195. When using a single air pressure sensor, the air pressure in each of the air springs 130, 132, 134, and 136 may be separately monitored, by shutting a valve the other three air springs, and determining the air pressure within a single air spring. The use of a single air pressure sensor reduces the costs and complexity of the air spring inflation system in comparison to using a system having a dedicated air pressure sensor for each air spring.

Based on the ride height (from which volume of air is determined) received from the ride height sensors 130a, 132a, 134a, and 136a, and the air pressure within each of the air springs 130, 132, 134, 136 received from the air pressure sensors 130b, 132b, 134b, and 136b, (or single air pressure sensor), the ECU 110 determines the weight of the vehicle. Based on the user selected terrain setting on the user interface 200 and vehicle type, the ECU 110 determines specified ride heights for the left and right front air springs and specified ride heights for the left and right rear air springs. Based on the determined weight of the vehicle and vehicle type, specified tire pressures for the left and right front tires and specified tire pressures for the left and right rear tires is determined. If necessary, the ride heights of the air springs are adjusted to the specified ride height settings by increasing or reducing the amount of air within the air springs 130, 132, 134, and 136. The specified tire pressures may be obtained via a lookup table or predetermined equation specific to the particular vehicle being used. The air springs 130, 132, 134, and 136 are then inflated to the specified ride heights. The tires are then inflated to the specified air pressures. The specific specified ride heights and tire pressures may vary from vehicle to vehicle, depending on the particular vehicle and suspension characteristics of the vehicle. Thus, the lookup table may also vary from vehicle to vehicle.

The determined weight may also be used for complying with bridge or road weight limits. The determined weight of the vehicle may be displayed on the user interface 200, allowing the vehicle driver to know whether the vehicle exceeds the rated load limit for a bridge or road.

In the case where the air spring ride heights are predetermined based on the selected terrain setting and vehicle type, the air springs may be adjusted to the predetermined ride height setting, and then the air pressures within each of the air springs are sensed to provide for a determined weight of the vehicle.

The air spring and tire inflation system 100 may include separate pneumatic circuits for the air springs and for the tires as illustrated in FIGS. 1A and 1B. In FIG. 1A, the system includes a low pressure air supply 190. Solenoid valve 172 is activated to allow valve 152 to be pneumatically actuated to allow the low pressure air supply 190 into the air pressure manifold 195. The low pressure air supply 190 may be used to fill or partially fill the air springs 130, 132, 134, and 136 through air conduits 130d, 132d, 134d, and 136d respectively. High pressure air supply 120 may be moved into air pressure manifold 195 by solenoid valve 170 opening valve 150 to fill air springs 130, 132, 134, and 136. To fill the air springs 130, 132, 134, and 136 with low pressure or high pressure air, solenoid valve 172 is activated to allow a flow of air to pneumatically actuate valve 152 to open the supply of low or high pressure air into air pressure manifold 195. Solenoid valve 162 may open to pneumatically actuate valve 140 to allow low or high pressure air into air spring 130 through air conduit 130d, solenoid valve 164 may open to pneumatically actuate valve 142 to allow low or high pressure air to air spring 132 through air conduit 132d, solenoid valve 166 may open to pneumatically actuate valve 144 to allow low or high pressure air to air spring 134 through air conduit 134d, and solenoid 168 may open to pneumatically activate valve 146 to allow low or high pressure air to air spring 136 through air conduit 136d. In operation, ECU 110 is in communication with valves 162, 164, 166, and 168 of air pressure manifold 195 to provide control of valves 140, 142, 144, and 146 to allow pressurized air from low pressure air supply 190 or high pressure air supply 120 to air springs 130, 132, 134, and 136 to provide the predetermined or specified ride heights for each air spring. In FIG. 1B, the system includes a low pressure air supply 190 and high pressure air supply 120. Solenoid valve 172' is activated to allow air flow to pneumatically activate valve 152' to allow the low pressure air supply 190 into the air pressure manifold 195. The low pressure air supply 190 may be used to fill or partially fill the tires 130', 132', 134', and 136' through air conduits 130d', 132d', 134d', and 136d' respectively. High pressure air supply 120 may be moved into air pressure manifold 195 by solenoid valve 170' opening to pneumatically activate valve 150' to fill tires 130', 132', 134', and 136'. To fill tires 130', 132', 134', and 136' with low pressure or high pressure air, solenoid valve 172' is opened to pneumatically actuate valve 152' to open the supply of low or high pressure air into air pressure manifold

195. Solenoid valve 162' may open to pneumatically activate valve 140' to allow low or high pressure air into tire 130' through air conduit 130d', solenoid valve 164' may open to pneumatically activate valve 142' to allow low or high pressure air to tire 132' through air conduit 132d', solenoid valve 166' may open to pneumatically activate valve 146' to allow low or high pressure air to air spring 134' through air conduit 134d', and solenoid valve 168' may open to pneumatically activate valve 146' to allow low or high pressure air to air spring 136' through air conduit 136'. In operation, ECU 110 is in communication with valves 162', 164', 166', and 168' of air pressure manifold 195 to provide control of valves 140', 142', 144', and 146' to allow pressurized air from low pressure air supply 190 or high pressure air supply 120 to tires 130', 132', 134', and 136' to provide the specified tire pressures for each tire. It will be appreciated that tire inflators are at the ends of air conduits 130d', 132d', 134d', and 136d'.

The tire pressures of tires 130', 132', 134', and 136' may be monitored with air pressure sensors 130a', 132a', 134a', and 136a' associated with tires 130', 132', 134', and 136' which are in communication with the ECU 110 via electrical lines 133c', 135c', 137c', and 139' respectively. Wireless communication between the tire pressure sensors and the ECU 110 is also possible. Alternately, a single tire pressure sensor may be positioned in the air pressure manifold 195. When using a single tire pressure sensor, the air pressure in each of the tires 130', 132', 134', and 136' may be separately monitored, by shutting a valve to the other three tires, and determining the air pressure within a single tire. The use of a single tire pressure sensor reduces the costs and complexity of the air spring inflation system in comparison to using a system having a dedicated tire pressure sensor for each tire.

A system intake and exhaust 180 from air pressure manifold 195 is also provided in FIG. 1A, wherein solenoid valve 160 is operable to actuate valve 154 to allow pressurized air to exit air manifold 195.

As shown in FIGS. 1A and 1B, the air spring and tire inflation system 100 includes separate pneumatic circuits for the inflation of the air springs and for the inflation of the tires. The pneumatic circuit may also include separate air pressure manifolds and separate ECUs, and even separate supplies of pressurized air. However, in FIGS. 1A and 1B, a single ECU is used and the air pressure manifold 195 is integrated to provide pressurized air to both the air springs 130, 132, 134, and 136 and tires 130', 132', 134', and 136' using a single air pressure manifold. A single supply of high pressure air 120 and a single supply of low pressure air 190 are also provided.

The integrated air spring and tire inflation system 100 shown in FIGS. 1A and 1B provides significant advantages over vehicles having separate and distinct air spring pneumatic circuits and tire inflation pneumatic circuits, each having their own ECU, air pressure manifold, and pressurized air supply. The present system 100 provides for the simultaneous adjustment of tire and suspension settings to improve vehicle performance, and also eliminates redundant components such as separate ECUs, air pressure manifolds, and pressurized air supplies, by integrating the air spring and tire inflation systems into a single ECU, air pressure manifold, and pressurized air supply. Thus, components such as ECUs, air pressure manifolds, and sources of pressurized air can be combined to reduce the overall part counts. In addition, integration of the air spring and tire inflation pneumatic circuits allows for tire inflation system logic to be combined with air suspension control logic, allowing for simultaneous adjustments to improve vehicle performance and safety.

As noted in the Background Section above, typical air suspension systems have utilized expandable air springs. In air springs with a flexible membrane, the operating pressures that may be utilized are limited because of the current limitations on flexible membrane and rubber construction. Thus, the typical operating pressure at normalized ride height is limited to 80-100 psi, up to 120 psi, with maximum pressure at full compression at around 200 psi. It is known that by increasing the effective spring rate of the strut assembly, the vehicle may achieve a higher ride frequency, and increased roll performance and lateral stability performance.

Accordingly, in FIG. 1A, high pressure air struts 130, 132, 134, and 136 may each be constructed as a high pressure air cylinder shock assembly as disclosed in U.S. Pat. No. 8,827,292, with or without the primary coil spring and/or tender springs, i.e. without any internal springs, with a cylinder float that does not expand as the air pressure within increases and which may operate with air pressures well over 200 psi, unlike conventional expandable air springs using a flexible membrane that are generally limited to 120 psi. The ability to provide air springs capable of operating at air pressures over 200 psi provides for a low spring rate at an unloaded ride height, but provides for a greater increase in spring rate as the air spring is compressed, in comparison to a flexible or expandable air spring. Therefore, when using a solid air spring, the solid air spring will provide more force when compressed than an expandable air spring providing for a higher primary roll stiffness for the solid air spring than for the expandable air spring.

In addition, the use of high pressure air springs to support the vehicle weight allows for smaller air springs than traditional expandable air springs, and further allows for ideal wheel rates. Furthermore, the use of high pressure air springs provides maximum air pressures high enough to raise the vehicle to maximum heights allowed by the air spring. As described below, this allows for a "fording" terrain setting to ride over streams or to provide a maximum height suspension setting to increase occupant survivability from near ground level explosions.

In systems with low air pressure air springs (120 psi or less), the air suspension requires large piston diameters and/or multiple air springs to handle the load necessary to support the weight of the vehicle, making packaging of the air springs more difficult. In addition, the use of lower pressure air springs prevents the use of optimal suspension wheel rates. Furthermore, a "fording" setting is not feasible because the low pressure air springs do not have the ability to raise the vehicle above the typical operational height based on air pressure limitations.

The air pressure manifold 195 shown in FIGS. 1A and 1B includes separate pneumatic circuits used to inflate and pressurize the air springs 130, 132, 134, and 136 used to support the vehicle and used to inflate or deflate individual tires 130', 132', 134', and 136'. The high pressure air pressure manifold 195 allows for the faster inflation of the tires. The main benefit for adjusting the ride height of the air springs using highly pressured air (175 psi or greater) is that a highly pressurized air supply contains a larger potential energy storage. For example, a tank of air pressurized at 500 psi can supply more air than a tank of air of the same size pressurized at 120 psi.

The air pressure manifold 195 is an integrated manifold that integrates a low pressure pneumatic circuit with lower pressure air line 190 (120 psi or less) and a high pressure pneumatic circuit with high pressure air line 120 (greater than 120 psi). The use of a high pressure pneumatic circuit reduces demand on the existing vehicle air system and allows for faster fill times for the air springs and tires. In air pressure manifold 195, the low pressure air line 190 may be used to drive the valves 140, 142, 144, 146, 148, 150, 152, and 154 to control the flow of high pressure air from high pressure air line 120 or low pressure air supply 190 to control the flow of air to the air springs 130, 132, 134, and 136 and tires 130', 132', 134', and 136'. In addition, the air springs 130, 132, 134, and 136 and tires 130', 132', 134', and 136' may be filled or partially filled with either the low pressure air supply or high pressure air supply, thereby reducing the demand on the high pressure system. In addition, the air pressure manifold 195 allows for opening of a pneumatic circuit between left and right side air springs on an axle of the vehicle, which provides for improved off-road mobility and traction during events which cause large suspension cross-articulation. Individual pneumatic air spring circuits can be linked to reduce vehicle roll stiffness, which is advantageous during large displacement cross-articulation events. For example, if a wheel speed sensor senses that one wheel is slipping, the ride height of the air spring for that wheel can be adjusted to increase the right height and eliminate or reduce the slippage.

Figure 2:
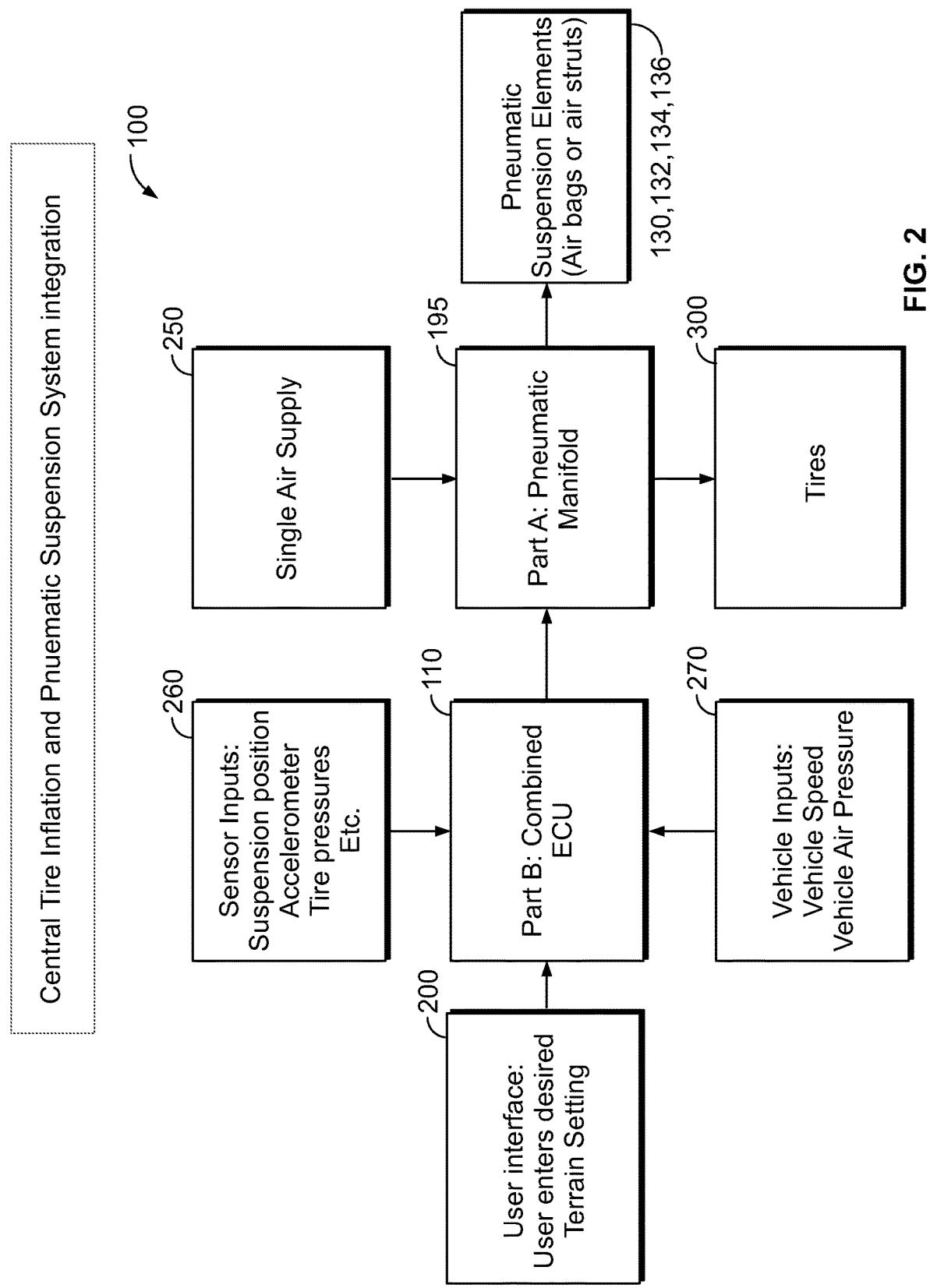
FIG. 2 is a block diagram showing elements of air spring and tire inflation system 100 shown in FIGS. 1A and 1B.

FIG. 2 is a block diagram of air spring and tire inflation system 100 shown in FIG. 1. The ECU 110 is in communication with user interface 200 where a user selects a user selectable terrain setting that is transmitted to ECU 110. Sensor inputs 260 such as air spring ride height, air spring pressures, accelerometer readings, tire pressures, etc. are received by ECU 110. The ECU 110 can receive measured current air spring position from ride height sensors 130*a*, 132*a*, 134*a*, and 136*a*, and current measured air pressure in air springs 130, 132, 134, and 136 using air pressure sensors 130*b*, 132*b*, 134*b*, and 136*b* shown in FIG. 1A. The sensed air spring position (ride height) and sensed air pressures within the air springs can be used to determine the vehicle weight. Vehicle inputs 270 such as vehicle speed and vehicle acceleration, and vehicle air pressure are also received by ECU 110. These measurements are used by the ECU to control and optimize the vehicle suspension. A single supply of high pressure air 250 is provided to air pressure manifold 195.

Based on the terrain setting selected, a ride height for the front and rear air springs is either predetermined based on the vehicle type and terrain setting selected, or is determined based on the selected terrain setting, and determined vehicle weight, and/or vehicle type. A vehicle weight can be determined by sensing the air pressure within each air spring and knowing the volume of air within the air spring which may be determined by the sensed ride height of each air spring. The weight of the front and rear axles of the vehicle (together amounting to a total vehicle weight) may be determined by the ECU 110. In addition, the weight may be determined based on the summation of the weight on the air springs on each corner of the vehicle. In this case, the tire pressure setting will be based on the weight for each corner. Some vehicles may be heavier on one side of the vehicle versus the other based on, for example, vehicle loading. Therefore the tire pressure can be optimized for the weight imbalance, based on the weight determination on each corner of the vehicle, and thus the tire pressure specified on one side of the vehicle may be greater or less than the tire pressure specified on the other side of the vehicle. Based on the determined weight of the vehicle and selected terrain setting, a specified air pressure for the front tires and a specified air pressure for the rear tires is determined using a lookup table or predetermined equation by the ECU 110 or user interface 200. The specified tire pressures may be automatically communicated to the air pressure manifold 195 in the case where the weight has been determined by the ECU 110 or user interface 200.

Once the specified front and rear tire pressures are determined, the ECU 110 communicates with air pressure manifold 195 to control the flow of air to tires 300 to inflate the front and rear tires to the specified front and rear tire pressures. Prior to, simultaneously, or after, inflating the front and rear tires to the specified front and rear tire pressures, the ECU communicates with the air pressure manifold 195 to inflate or deflate the front and rear springs 130, 132, 134, and 136 to reach a predetermined or specified ride height based on the selected terrain setting and vehicle type, or based on the selected terrain setting, determined vehicle weight, and/or vehicle type.

It will be appreciated that in some instances, it is unnecessary to determine the vehicle weight before specifying the left and right front and rear tire pressures. For example, in some cases, the weight of the vehicle does not change. As a result, the ride height settings for the air springs and the tire pressures may be specified based on the terrain setting selected and the vehicle type. As another example, a vehicle such as a dump truck may be in either an unloaded state or a loaded state. By selecting a setting that indicates whether the vehicle is an unloaded or loaded state, the system may not need to determine the weight of the vehicle and automatically provide specified ride heights for the left and right front and rear air springs and specified left and right side front and rear tire pressures if the vehicle is in an unloaded state, and different specified ride height settings and tire pressure settings when the vehicle is in a loaded state.

It is also possible for the system 100 to automatically adjust the ride heights and tire pressures without selection of a setting on the user interface. For example, a vehicle could be set up to always maintain a predetermined ride height and adjust tire pressures after it is calculated. In this case, no user interface would be required. Furthermore, the system may continuously monitor the weight of the vehicle. When the system notices a weight change, the system would automatically adjust the ride heights and tire pressures. An example could be a dump truck. The driver would not have any cab controls but tire pressures and ride heights of the air springs would automatically adjust when the weight sensing detects the dump bed full, empty, or any partial load.

The air spring and tire inflation system 100 has been described with regard to a vehicle with four wheels (4×4). However, the system could also be used on vehicles with more wheels. For example, on 6×6 vehicles only four ride height sensors could be installed. The air springs in this example could be connected in series so the load is equalized like a walking beam suspension. This could also hold true for tires for the rear 2 axles on a 6×6 vehicle.

Figure 3:
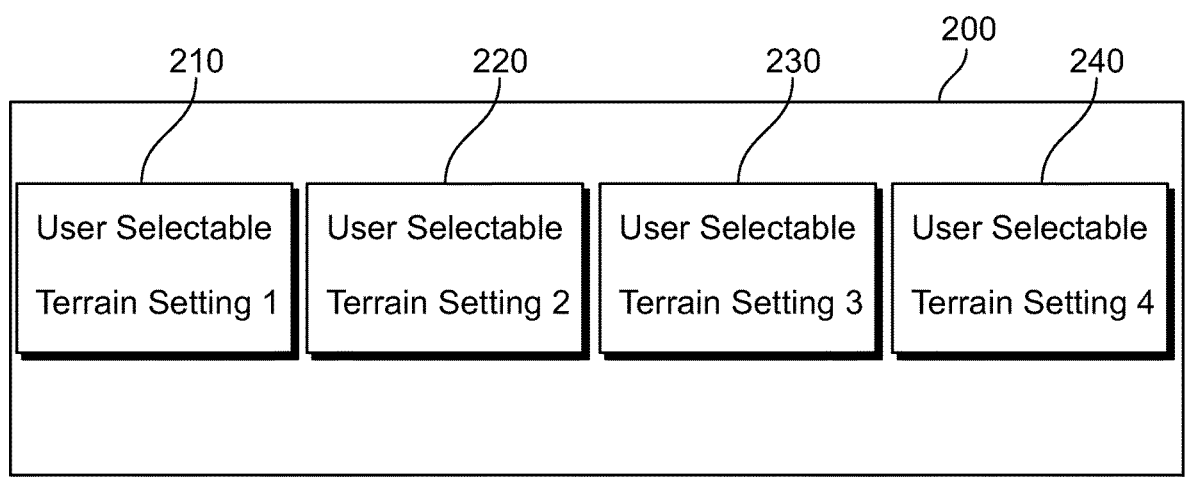
FIG. 3 is a view of user interface 200 showing four user selectable terrain settings.

FIG. 3 is a view of user interface 200 having four user selectable terrain settings 210, 220, 230, and 240. The user interface 200 could be a touch screen, or include physical buttons that can be depressed. Other configurations are also possible, including a voice activated user interface. Additional or fewer settings could also be provided. Upon selection of a terrain setting by a user, a ride height setting is either predetermined based on the selected terrain setting and vehicle type, or determined based on the selected terrain setting, and determined vehicle weight, and/or vehicle type. The ECU 110 then communicates with the air pressure manifold 195 which inflates or deflates the front and rear air springs until a desired ride height is achieved.

TABLE 1

| Vehicle Type | 4 × 4 Light Tactical Vehicle | | 4 × 4 Heavy Tactical Vehicle | |
|---|---|---|---|---|
| Setting 1-On Road Mode | | | | |
| Vehicle Weight | 10,000 lbs GVW | 15,000 lbs GVW | 45,000 lbs GVW | 55,000 lbs GVW |
| Ride Height | −1 | −1.5 | −1 | −2 |
| Air Cylinder Pressure (F/R psi) | 100/100 | 175/180 | 120/145 | 280/300 |
| Tire Pressure (F/R psi) | 75/80 | 80/85 | 90/85 | 105/110 |
| Setting 2-Cross Country Mode | | | | |
| Vehicle Weight | 10,000 lbs GVW | 15,000 lbs GVW | 45,000 lbs GVW | 55,000 lbs GVW |
| Ride Height | 1 | 1 | 1 | 1 |
| Air Cylinder Pressure (F/R psi) | 100/100 | 175/180 | 120/145 | 280/300 |
| Tire Pressure (F/R psi) | 55/58 | 60/65 | 70/70 | 75/73 |

In TABLE 1 above (and TABLE 2), example ride height and tire pressures are set forth to provide an example of how the system determines the air pressures for the front and rear tires based on the terrain setting and vehicle type. In TABLE 1, the user selectable "on road" terrain setting 210 (Setting 1) has been selected. For a 10,000 lb. Gross Vehicle Weight (GVW) 4×4 Light Tactical Vehicle, the ride height is predetermined or specified to be −1, or 1 inch below a nominal ride height setting. At the predetermined or specified ride height the air pressure in the front air springs is 100 psi and the air pressure in the rear air springs is 100 psi. Based on the selected terrain setting and determined vehicle weight the front tire air pressure is specified to be 75 psi and rear tire air pressure is specified to be 80 psi. For a 15,000 lb. Gross Vehicle Weight (GVW) 4×4 Light Tactical Vehicle, the ride height is predetermined or specified to be −1.5, or 1.5 inches below a nominal ride height setting. At the predetermined or specified ride height the air pressure in the front air springs is 175 psi and the air pressure in the rear air springs is 180 psi. Based on the selected terrain setting and determined vehicle weight the front tire air pressure is specified to be 80 psi and rear tire air pressure is specified to be 85 psi.

For the "on road" terrain setting 210, for a 45,000 lb. Gross Vehicle Weight (GVW) 4×4 Heavy Tactical Vehicle, the ride height is predetermined or specified to be −1, or 1 inch below a nominal ride height setting. At the predetermined or specified ride height the air pressure in the front air springs is 120 psi and the air pressure in the rear air springs is 145 psi. Based on the selected terrain setting and determined vehicle weight the front tire air pressure is specified to be 90 psi and rear tire air pressure is specified to be 85 psi. For a 55,000 lb. Gross Vehicle Weight (GVW) 4×4 Heavy Tactical Vehicle, the ride height is predetermined or specified to be −2, or 2 inches below a nominal ride height setting. At the predetermined or specified ride height the air pressure in the front air springs is 280 psi and the air pressure in the rear air springs is 300 psi. Based on the selected terrain setting and determined vehicle weight the front tire air pressure is specified to be 105 psi and rear tire air pressure is specified to be 110 psi.

The "on road" setting is designed for driving on normal road conditions on primary roads.

In TABLE 1 above, user selectable "cross country" terrain setting 220 (Setting 2) has been selected. The "cross country" terrain setting is for off road terrains. For a 10,000 lb. Gross Vehicle Weight (GVW) 4×4 Light Tactical Vehicle, the ride height is predetermined or specified to be 1, or 1 inch above a nominal ride height setting. At the predetermined or specified ride height the air pressure in the front air springs is 100 psi and the air pressure in the rear air springs is 100 psi. Based on the selected terrain setting and determined vehicle weight the front tire air pressure is specified to be 55 psi and rear tire air pressure is specified to be 58 psi. For a 15,000 lb. Gross Vehicle Weight (GVW) 4×4 Light Tactical Vehicle, the ride height is predetermined or specified to be 1, or 1 inch above a nominal ride height setting. At the predetermined or specified ride height the air pressure in the front air springs is 175 psi and the air pressure in the rear air springs is 180 psi. Based on the selected terrain setting and determined vehicle weight the front tire air pressure is specified to be 60 psi and rear tire air pressure is specified to be 65 psi.

For the "cross country" terrain setting 220, for a 45,000 lb. Gross Vehicle Weight (GVW) 4×4 Heavy Tactical Vehicle, the ride height is predetermined or specified to be 1, or 1 inch above a nominal ride height setting. At the predetermined or specified ride height the air pressure in the front air springs is 120 psi and the air pressure in the rear air springs is 145 psi. Based on the selected terrain setting and determined vehicle weight the front tire air pressure is specified to be 70 psi and rear tire air pressure is specified to be 70 psi. For a 55,000 lb. Gross Vehicle Weight (GVW) 4×4 Heavy Tactical Vehicle, the ride height is predetermined or specified to be 1, or 1 inch above a nominal ride height setting. At the predetermined or specified ride height the air pressure in the front air springs is 280 psi and the air pressure in the rear air springs is 300 psi. Based on the selected terrain setting and determined vehicle weight the front tire air pressure is specified to be 75 psi and rear tire air pressure is specified to be 73 psi.

TABLE 2

| Vehicle Type | 4 × 4 Light Tactical Vehicle | | 4 × 4 Heavy Tactical Vehicle | |
|---|---|---|---|---|
| Setting 3-Trail Mode | | | | |
| Vehicle Weight | 10,000 lbs GVW | 15,000 lbs GVW | 45,000 lbs GVW | 55,000 GVW |
| Ride Height (in) | 0 | 0 | 0 | 0 |

TABLE 2-continued

| Vehicle Type | 4 × 4 Light Tactical Vehicle | | 4 × 4 Heavy Tactical Vehicle | |
| --- | --- | --- | --- | --- |
| Air Cylinder Pressure (F/R psi) | 100/100 | 175/180 | 120/145 | 280/300 |
| Tire Pressure (F/R psi) | 60/62 | 63/70 | 78/80 | 80/90 |
| Setting 4-Fording Mode | | | | |
| Vehicle Weight | 10,000 lbs GVW | 15,000 lbs GVW | 45,000 lbs GVW | 55,000 lbs GVW |
| Ride Height (in) | 4 | 4 | 4 | 4 |
| Air Cylinder Pressure (F/R psi) | 100/100 | 175/180 | 120/145 | 280/300 |
| Tire Pressure (F/R psi) | 90/90 | 90/90 | 80/80 | 90/92 |

In TABLE 2 above, user selectable "trails" terrain setting 230 (Setting 3) has been selected. For a 10,000 lb. Gross Vehicle Weight (GVW) 4×4 Light Tactical Vehicle, the ride height is predetermined or specified to be 0, or 0 inches below a nominal ride height setting. At the predetermined or specified ride height the air pressure in the front air springs is 100 psi and the air pressure in the rear air springs is 100 psi. Based on the selected terrain setting and determined vehicle weight the front tire air pressure is specified to be 60 psi and rear tire air pressure is specified to be 62 psi. For a 15,000 lb. Gross Vehicle Weight (GVW) 4×4 Light Tactical Vehicle, the ride height is predetermined or specified to be 0, or 0 inches below a nominal ride height setting. At the predetermined or specified ride height the air pressure in the front air springs is 175 psi and the air pressure in the rear air springs is 180 psi. Based on the selected terrain setting and determined vehicle weight the front tire air pressure is specified to be 63 psi and rear tire air pressure is specified to be 70 psi.

For the "trails" terrain setting 230, for a 45,000 lb. Gross Vehicle Weight (GVW) 4×4 Heavy Tactical Vehicle, the ride height is predetermined or specified to be 0, or 0 inches below a nominal ride height setting. At the predetermined or specified ride height the air pressure in the front air springs is 120 psi and the air pressure in the rear air springs is 145 psi. Based on the selected terrain setting and determined vehicle weight the front tire air pressure is specified to be 78 psi and rear tire air pressure is specified to be 80 psi. For a 55,000 lb. Gross Vehicle Weight (GVW) 4×4 Heavy Tactical Vehicle, the ride height is predetermined or specified to be 0, or 0 inches below a nominal ride height setting. At the predetermined or specified ride height the air pressure in the front air springs is 280 psi and the air pressure in the rear air springs is 300 psi. Based on the selected terrain setting and determined vehicle weight the front tire air pressure is specified to be 80 psi and rear tire air pressure is specified to be 90 psi.

The "trails" setting is designed for driving on a less rugged terrain than the "cross country" terrain setting.

In TABLE 2 above, user selectable "fording" terrain setting 240 (Setting 4) has been selected. The "fording" terrain setting is for fording streams or for use in a high mine area to help with the survivability of a near ground explosion. For a 10,000 lb. Gross Vehicle Weight (GVW) 4×4 Light Tactical Vehicle, the ride height is predetermined or specified to be 4, or 4 inches above a nominal ride height setting. At the predetermined or specified ride height the air pressure in the front air springs is 100 psi and the air pressure in the rear air springs is 100 psi. Based on the selected terrain setting and determined vehicle weight the front tire air pressure is specified to be 90 psi and rear tire air pressure is specified to be 90 psi. For a 15,000 lb. Gross Vehicle Weight (GVW) 4×4 Light Tactical Vehicle, the ride height is predetermined or specified to be 4, or 4 inches above a nominal ride height setting. At the predetermined or specified ride height the air pressure in the front air springs is 175 psi and the air pressure in the rear air springs is 180 psi. Based on the selected terrain setting and determined vehicle weight the front tire air pressure is specified to be 90 psi and rear tire air pressure is specified to be 90 psi.

For the "fording" terrain setting 240, for a 45,000 lb. Gross Vehicle Weight (GVW) 4×4 Heavy Tactical Vehicle, the ride height is predetermined or specified to be 4, or 4 inches above a nominal ride height setting. At the predetermined or specified ride height the air pressure in the front air springs is 120 psi and the air pressure in the rear air springs is 145 psi. Based on the selected terrain setting and determined vehicle weight the front tire air pressure is specified to be 80 psi and rear tire air pressure is specified to be 80 psi. For a 55,000 lb. Gross Vehicle Weight (GVW) 4×4 Heavy Tactical Vehicle, the ride height is predetermined or specified to be 4, or 4 inches above a nominal ride height setting. At the predetermined or specified ride height the air pressure in the front air springs is 280 psi and the air pressure in the rear air springs is 300 psi. Based on the selected terrain setting and determined vehicle weight the front tire air pressure is specified to be 90 psi and rear tire air pressure is specified to be 92 psi.

In the "fording" setting or "Mine High" setting, the ride height may be selected that is 20-50% of jounce travel of the air springs.

Other terrain settings may also be used. For example, a "kneel" terrain setting may be used where the ride height is lowered and tire air pressures reduced to provide a lowered height for low clearance situations, for storage, transport, or obstacle avoidance. In addition, a horizon leveling mode may also be selected, which will level the vehicle out when parked on uneven terrain, and may be used for improved vehicle egress/ingress, antennae or boom deployment, or to provide a level firing platform for weapons release.

In addition, the air springs 130, 132, 134, and 136 may be cross-plumbed by connecting the pneumatic circuits running to individual air springs, which allows the system to reduce or increase the vehicle roll stiffness to improve the off-road performance of the vehicle.

In addition, referring back to FIG. 2, sensors inputs 260 may include an accelerometer and vehicle inputs 270 may include a vehicle speed input. The ECU 110 may include provisions to change the ridge height and tire pressures to a safer mode of operation if the vehicle exceeds threshold accelerations and/or speed. In particular, if the vehicle exceeds a threshold acceleration or speed, the ECU 110 will communicate to the air pressure manifold 195 to reduce the ride height and adjust the tire pressures.

Figure 4B:
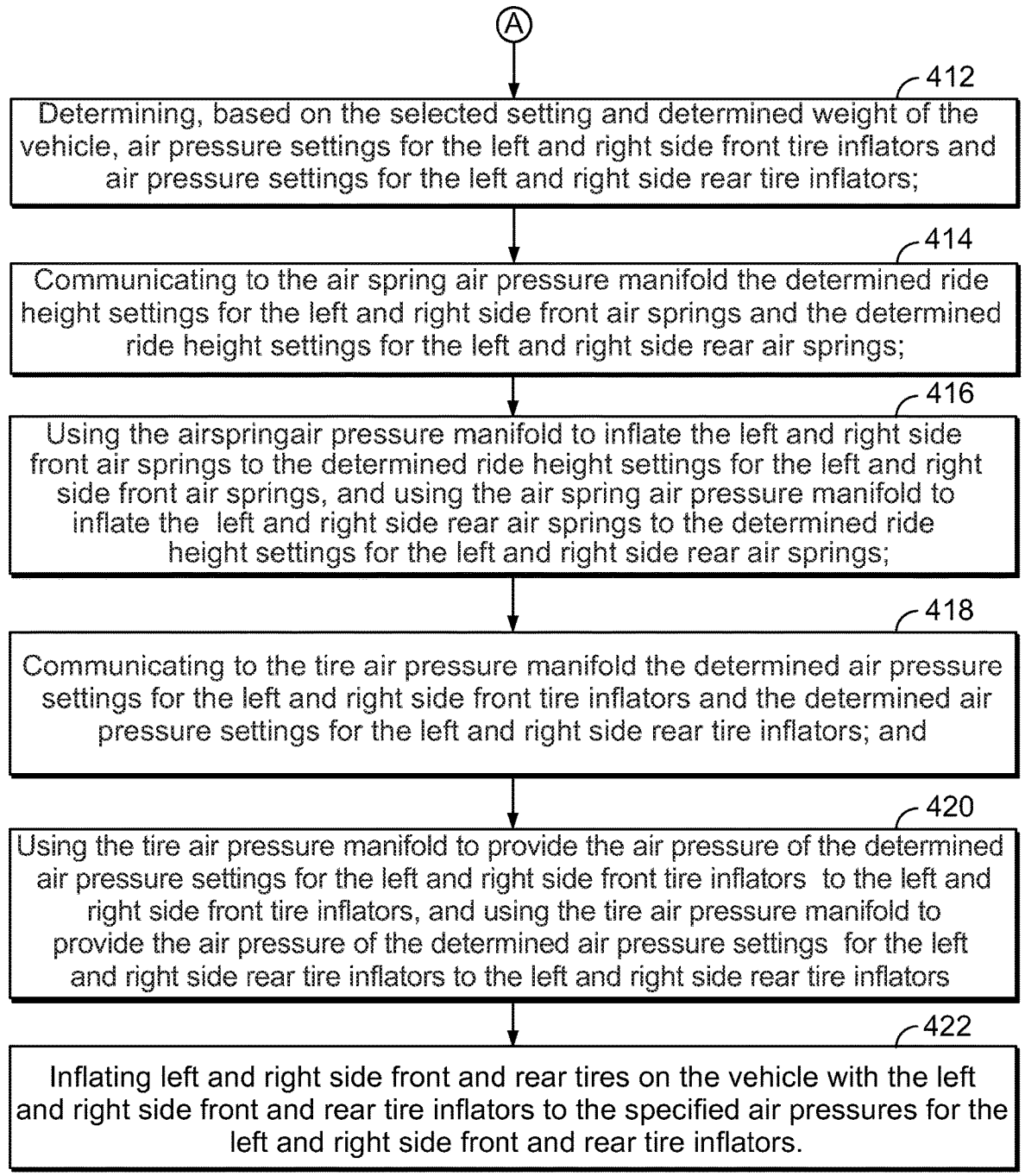

FIGS. 4A and 4B show the steps of an example method 400 of setting ride heights and air pressures of air springs and tires in a vehicle having an air spring and tire inflation system is provided including the step 402 providing an air spring and tire inflation system including a control system, left and right side front air springs each monitored by an air pressure sensor in communication with the control system to sense air pressures within the left and right side front air springs, and each having an associated ride height sensor in communication with the control system to sense the ride heights of the left and right side front air springs, left and right side rear air springs each monitored by an air pressure sensor in communication with the control system to sense air pressures within the left and right side rear air springs, and each having an associated ride height sensor in communication with the control system to sense the ride heights of the left and right side rear air springs, left and right side front tire inflators, left and right side rear tire inflators, an air spring air pressure manifold, a tire air pressure manifold, a supply of pressurized air in communication with the air spring and tire air pressure manifolds, one or more air conduits extending from the air spring air pressure manifold to the left and right side front air springs, one or more air conduits extending from the air spring air pressure manifold to the left and right side rear air springs, one or more air conduits extending from the tire air pressure manifold to the left and right side front tire inflators, one or more air conduits extending from the tire air pressure manifold to the left and right side rear tire inflators, a user interface in communication with the control system, wherein the user interface includes a plurality of user selectable settings.

Method 400 further includes the step 404 of selecting a setting on the user interface; the step 406 of receiving air pressure and ride height readings from the left and right side front air springs and air pressure and ride height readings from the left and right side rear air springs from the air pressure and ride height sensors; the step 408 of determining a weight of a vehicle on which the air spring and tire inflation system is positioned based on the received air pressure and ride height readings; the step 410 of determining, based on the selected setting, ride height settings for the left and right side front air springs and ride height settings for the left and right side rear air springs; the step 412 of determining, based on the selected setting and determined weight of the vehicle, air pressure settings for the left and right side front tire inflators and air pressure settings for the left and right side rear tire inflators; the step 414 of communicating to the air spring air pressure manifold the determined ride height settings for the left and right side front air springs and the determined ride height settings for the left and right side rear air springs; the step 416 of using the air pressure manifold to inflate the left and right side front air springs to the determined ride height settings for the left and right side front air springs, and the air spring air pressure manifold is adapted to inflate the left and right side rear air springs to the determined ride height settings for the left and right side rear air springs; the step 418 of communicating to the tire air pressure manifold the determined air pressure settings for the left and right side front tire inflators and the determined air pressure settings for the left and right side rear tire inflators; and the step 420 of using the tire air pressure manifold to provide the air pressure of the determined air pressure settings for the left and right side front tire inflators to the left and right side front tire inflators, and the tire air pressure manifold is adapted to provide the air pressure of the determined air pressure settings for the left and right side rear tire inflators to the left and right side rear tire inflators.

Example embodiments of the present embodiments have been described above. Those skilled in the art will understand that changes and modifications may be made to the described embodiments without departing from the true scope of the present invention, which is defined by the claims.

We claim:

1. A method of setting ride heights and air pressures of air springs in a vehicle having an air spring inflation system, including:

providing an air spring inflation system including a control system, left and right side front air springs each monitored by an air pressure sensor in communication with the control system to sense air pressures within the left and right side front air springs, and each having an associated ride height sensor in communication with the control system to sense the ride heights of the left and right side front air springs, left and right side rear air springs each monitored by an air pressure sensor in communication with the control system to sense air pressures within the left and right side rear air springs, and each having an associated ride height sensor in communication with the control system to sense the ride heights of the left and right side rear air springs, an air spring air pressure manifold, a supply of pressurized air in communication with the air spring air pressure manifold, one or more air conduits extending from the air spring air pressure manifold to the left and right side front air springs, one or more air conduits extending from the air spring air pressure manifold to the left and right side rear air springs, a user interface in communication with the control system, wherein the user interface includes a plurality of user selectable settings;

selecting a setting on the user interface;

receiving air pressure and ride height readings from the left and right side front air springs and air pressure and ride height readings from the left and right side rear air springs from the air pressure and ride height sensors;

determining a weight of a vehicle on which the air spring and tire inflation system is positioned based on the received air pressure and ride height readings;

determining, based on the selected setting, ride height settings for the left and right side front air springs and ride height settings for the left and right side rear air springs;

communicating to the air spring air pressure manifold the determined ride height settings for the left and right side front air springs and the determined ride height settings for the left and right side rear air springs;

using the air spring air pressure manifold to inflate the left and right side front air springs to the determined ride height settings for the left and right side front air springs, and using the air spring air pressure manifold to inflate the left and right side rear air springs to the determined ride height settings for the left and right side rear air springs;

wherein the air springs are initially inflated with a low pressure air supply of 120 psi or less extending through the air spring air pressure manifold; and wherein the air springs are then inflated with a high pressure air supply of 150 psi or more extending through the air spring air pressure manifold.

2. The method of claim 1, wherein the ride height for the left and right side front air springs, and the ride height for the left and right side rear air springs, are automatically set by the system without any human action.

3. The method of claim 1, wherein the left and right side front air springs, and the left and right side rear air springs, each comprise a cylinder shock assembly having:
- a damper having a first end and a second end, wherein the first end includes a first mount and the second end of the damper extends into an air cylinder float;
- the damper includes a housing defining a cavity, the damper having a rod positioned in the air cylinder float, the rod having a first end positioned within the cavity of the damper and a second end affixed to an end cap that is connected to a first end of the air cylinder float;
- a first piston affixed to the first end of the rod within the cavity of the damper,
- a second piston affixed to the damper, the second piston having one or more seals on an outer surface thereof that sealingly engage an inner surface of the air cylinder float;
- wherein the air cylinder float is a solid member that does not expand as the air pressure within increases during compression.

4. The method of claim 3, wherein at a designed vehicle ride height the air pressure within the air cylinder floats is 175 psi or more.

5. A method of setting ride heights and air pressures of air springs in a vehicle having an air spring inflation system, including:
- providing an air spring inflation system including a control system, left and right side front air springs each monitored by an air pressure sensor in communication with the control system to sense air pressures within the left and right side front air springs, and each having an associated ride height sensor in communication with the control system to sense the ride heights of the left and right side front air springs, left and right side rear air springs each monitored by an air pressure sensor in communication with the control system to sense air pressures within the left and right side rear air springs, and each having an associated ride height sensor in communication with the control system to sense the ride heights of the left and right side rear air springs,—an air spring air pressure manifold, a supply of pressurized air in communication with the air spring air pressure manifold, one or more air conduits extending from the air spring air pressure manifold to the left and right side front air springs, one or more air conduits extending from the air spring air pressure manifold to the left and right side rear air springs, a user interface in communication with the control system, wherein the user interface includes a plurality of user selectable settings;
- selecting a setting on the user interface;
- receiving air pressure and ride height readings from the left and right side front air springs and air pressure and ride height readings from the left and right side rear air springs from the air pressure and ride height sensors;
- determining, based on the selected setting, ride height settings for the left and right side front air springs and ride height settings for the left and right side rear air springs;
- communicating to the air spring air pressure manifold the determined ride height settings for the left and right side front air springs and the determined ride height settings for the left and right side rear air springs;
- using the air spring air pressure manifold to inflate the left and right side front air springs to the determined ride height settings for the left and right side front air springs, and to inflate the left and right side rear air springs to the determined ride height settings for the left and right side rear air springs;
- wherein the air springs are initially inflated with a low pressure air supply of 120 psi or less extending through the air spring air pressure manifold; and
- wherein the air springs are then inflated with a high pressure air supply of 150 psi or more extending through the air spring air pressure manifold.

6. The method of claim 5, further including adjusting the ride height of one of the left or right front or rear air springs in response to a signal received from a wheel speed sensor for increasing the traction of the vehicle.

* * * * *